Aug. 2, 1949.  H. A. HUTCHINS  2,477,748
FORK STRUCTURE FOR MOTORCYCLES OR THE LIKE
Filed Feb. 10, 1945
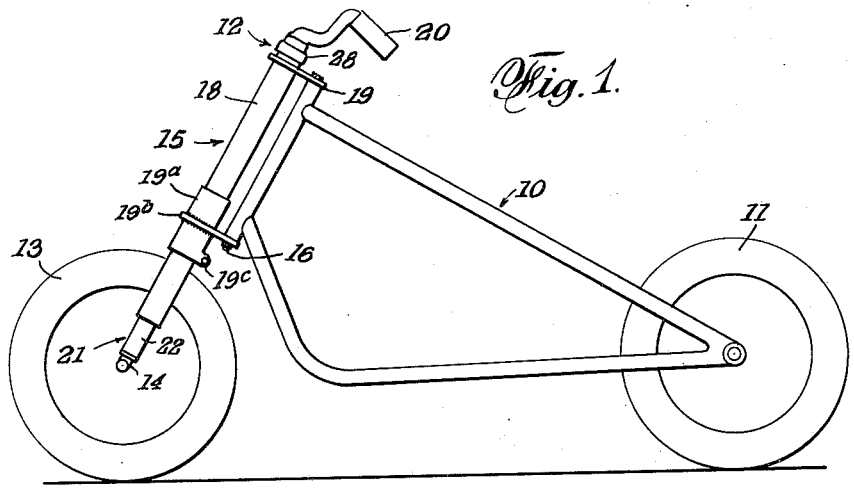
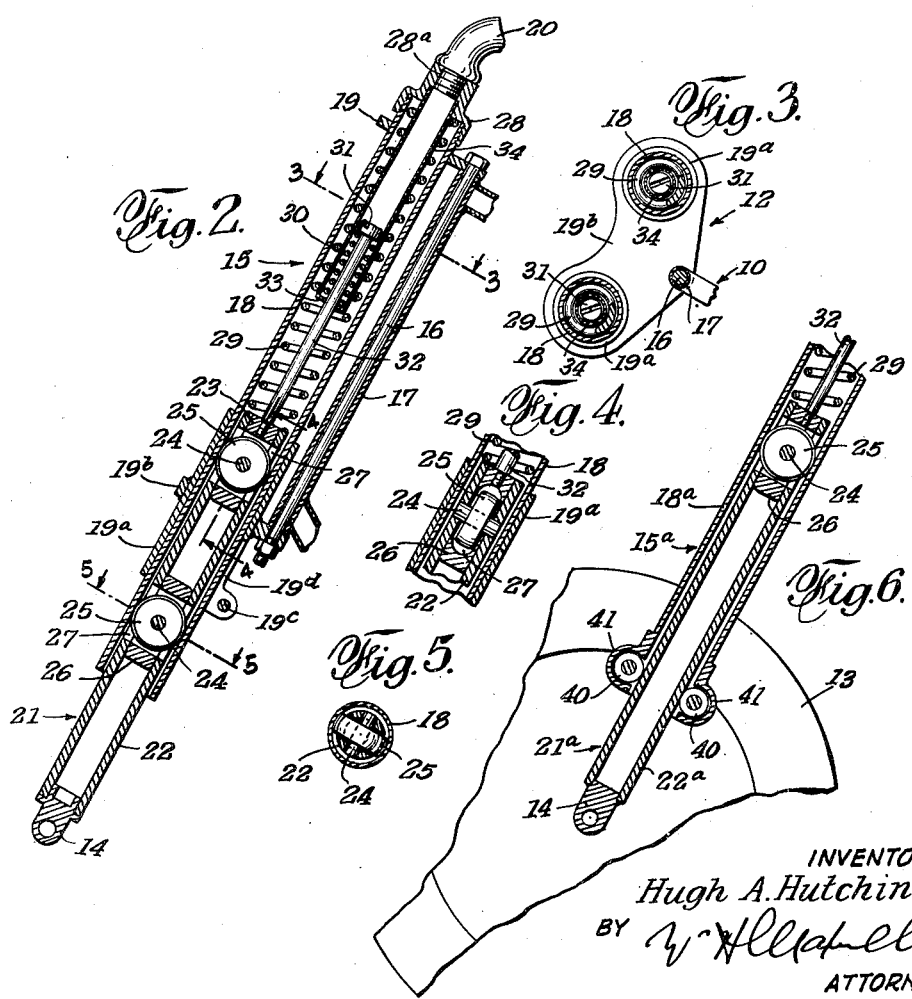
INVENTOR
Hugh A. Hutchins
BY
ATTORNEY Patented Aug. 2, 1949

2,477,748

UNITED STATES PATENT OFFICE 2,477,748

FORK STRUCTURE FOR MOTORCYCLES OR THE LIKE

Hugh A. Hutchins, Arcadia, Calif.

Application February 10, 1945, Serial No. 577,211

6 Claims. (Cl. 280—277)

1

This invention relates to fork structures of vehicles such as motorcycles and bicycles, and has for an object to provide compact, simple and durable means for efficiently absorbing road and other shocks transmitted from the front wheel of such vehicles.

Another object of the invention is to provide means, in the steering head of a vehicle such as a motorcycle or a bicycle, for guiding the wheel-carrying stem means thereof so as to support the same in an efficient and frictionless manner.

Another object of this invention is to provide a fork structure of the indicated type in which lateral, frictionless support of the wheel-carrying stem means thereof is afforded.

Another object of the invention is to provide a fork structure of a vehicle having means whereby the wheel-carrying stem thereof may be longitudinally adjusted in accordance with variable loading on the vehicle.

A further object of the invention is to provide a fork structure of the indicated type of vehicle contemplating free and easy longitudinal movement of the wheel-carrying stem in the frame of said vehicle.

The various objects and features of my invention will be fully understood from the following detailed description of typical preferred forms and applications of the invention, throughout which description reference is made to the accompanying drawings, in which:

Fig. 1 is a side elevational view, in somewhat diagrammatic form, of a vehicle incorporating features of the invention.

Fig. 2 is an enlarged, longitudinal sectional view of the fork structure of the vehicle shown in Fig. 1.

Fig. 3 is a cross sectional view as taken on the line 3—3 of Fig. 2.

Fig. 4 is a fragmentary longitudinal sectional view as taken on the line 4—4 of Fig. 2.

Fig. 5 is a cross sectional view as taken on the line 5—5 of Fig. 2.

Fig. 6 is a fragmentary view, similar to Fig. 2, and showing a modification of the invention.

The structure of the invention as herein illustrated may be said to comprise a frame 10, mounting a rear wheel 11, and including a front steering fork structure 12, carrying a front wheel 13.

The frame may be formed in any conventional manner and may be so arranged as to support a rider as on a motorcycle or bicycle.

According to the invention, the means 12 may include two tubular structures 15 arranged on either side of the wheel 13. Said tubular struc-

2 tures 15 may each include a tube 18 and may be adjustably mounted on the frame 10. For this purpose one end, preferably the upper end, of each tube 18 may have slidable engagement in a plate 19 which may be carried as by a king bolt or pin 16 disposed within a tube 17 forming the front end part of the frame 10. The other end of each of said tubes 18 may be disposed as in a sleeve 19ᵃ which may be fixed at an intermediate point of its length to a plate 19ᵇ which is similar to the plate 19. The plates 19 and 19ᵇ are preferably positioned at either end of the tube 17 and said king bolt 16 passes through aligned holes in said plates to provide a pivotal mounting for the means 12. Each sleeve 19ᵃ may have sliding engagement with its respective tube 18, and said tubes may be adjustably secured in said sleeves as by means of a clamping bolt 19ᶜ. Clamping of said sleeves 19ᵃ may be achieved as by means of a longitudinal slot 19ᵈ formed in each sleeve 19ᵃ to provide said sleeves with clamping resiliency. By the adjustment above described, the fork structure 12 may be positioned in such relation to the frame 10 of the vehicle as to afford the desired cushioning effect of the shock absorbing means hereinafter described. Such adjustment may be made in accordance with the loading of said vehicle as can be understood.

The tube 18 of each structure 15 is made of sufficient length and size to afford room for any of the movements which the fork may make when the vehicle is in use. Internally and longitudinally arranged within said tube 18 and movable telescopically therein, there may be provided a wheel-carrying assembly stem structure 21 having an end fitting 14 for receiving the axle or shaft of the wheel 13. Inasmuch as there are two of the structures 15 said wheel is disposed between the members 21 thereof.

Each stem structure 21 may comprise a tube 22 loosely fitted for longitudinal movement in the tube 18 and provided at one end with a cap 23. Intermediate spaced portions of the stem structure 21 may have carried therein transverse pins 24 in spaced relation, and on said pins there may be mounted rollers 25 preferably having their peripheral surfaces curved to suit the transverse curvature of the outer tube 18 against which they bear, said rollers 25 being larger in diameter than the diameter of the tube 22 for this purpose. In order to seal off the inner portion of the tube 22 from dust, and the like, the rollers 25 may be mounted in housing inserts 26 and said wheels mounted in passages 27 formed in both said inserts and in the tube 22.

The closure cap 23 may form part of one of said inserts 26.

The tube 18 of each of the structures 15 may be preferably capped as by means 28 at the upper end of the tube 18, and said cap 28 and the inner telescoping stem structure 21 may serve as opposed abutments for cushioning or shock absorbing means such as the coil spring 29. It will be noted that the spring 29 is of considerable length so as to render it soft in action, and that the rollers 25 are sufficiently spaced apart to afford good and firm lateral support of the telescoping structure 21 within the tube 18. It will also be seen that rotation of the stem structure 21 within the tube 18 is obviated by the interconnection of the tube structure 21 by the shaft or axle of the wheel 13.

The caps 28 of the structures 15 may serve to carry means whereby the forked structure 12, and consequently the wheel 13, may be steered. Such means may comprise handle bars 20 which may be fixed in position as by engagement in a threaded portion 28a of each cap 28. It is apparent that steering movement of the fork structure 12 is about the pivot formed by the king bolt 16.

The assembly structure 15 may be provided with counteracting or snubber means such as a spring 30 engaged between an abutment head 31 carried by a rod 32 forming a longitudinal extension of the assembly structure 21, and the end wall 33 of a tube 34 disposed within the convolutions of the spring 29 and suitably secured to the cap 28. It may be seen from this structure that the spring 30 may be of any suitable length, not being limited in its length by the spring 29 inasmuch as it is disposed within the convolutions of the latter spring. This arrangement of the springs 29 and 30 affords the previously mentioned soft action of the long shock absorbing spring 29.

In the structure of the modification shown in Fig. 6, the assembly 15a may include a longitudinal outer tube 18a, and in this instance, may be provided with means for supporting flanking lateral rollers 40 having roller engagement on either side of the inner telescoping tube 22a of the assembly 21a and housed within portions 41 carried by the tube 18a. These rollers 40 are preferably disposed at the lower end of the structure 15, the upper end carrying a roller 25 similar to the rollers described for the earlier form of the invention. In other respects the structure of Fig. 7 may follow that of Figs. 2 to 6, inclusive.

From the foregoing it may be seen that road or other shocks which may be transmitted from the wheel 13 are amply absorbed by the spring means 29 and that the longitudinal movement of the assembly 21 or 21a which telescopically moves in the outer tube 18 or 18a, is rendered smooth and substantially frictionless by the roller means 25 and/or 40. It may also be seen that any forces tending to cause lateral displacement of the tube assembly 21 in the tube 18 are counteracted by the mentioned rollers 25 and 40 so as to afford a free and easy movement of the assembly 21 in the manner above set forth.

Having described only certain typical, preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In a fork structure for vehicles of the character indicated, a straight elongate outer tube having pivotal engagement with the frame of said vehicle whereby said vehicle may be steered and being closed at its upper end, a wheel, a straight elongate stem structure carrying said wheel and telescopically arranged in said outer tube and depending from the lower end thereof, means for absorbing shock transmitted by said wheel through said stem structure to said outer tube, said shock absorbing means comprising spring means arranged in the outer tube and confined between the upper end of said stem structure and the closed upper end of said outer tube, and including a shock absorbing counteracting snubbing spring within the outer tube above the upper end of the stem, and anti-friction means carried by the stem structure and having rolling engagement with the inner wall of said outer tube.

2. In combination a vehicle frame of the character described having a front end part, a wheel, and a structure carrying the wheel and pivotally supported by said frame part including spaced parallel straight tubes arranged parallel with said frame part immediately forward thereof, means connecting the upper and lower end portions of the tubes together and to the said frame part, straight stems carried by the tubes to reciprocate therein and projecting downwardly from the tubes to carry the wheel, compression springs confined in the upper end portions of the tubes above the upper ends of the stems, and means cushioning downward movement of the stems in the tubes including heads in the upper portions of the tubes connected to the upper ends of the stems and compression springs supporting the heads and located within the first mentioned compression springs above the upper ends of the stems.

3. In combination a vehicle frame of the character described having a front end part, a wheel, and a structure carrying the wheel and pivotally supported by said frame part including spaced parallel straight tubes arranged parallel with said frame part immediately forward thereof, means connecting the upper and lower end portions of the tubes together and to the said frame part, straight stems entering the tubes from their lower ends and carried by the tubes to reciprocate therein and projecting downwardly from the tubes to carry the wheel, compression springs confined in the upper end portions of the tubes above the upper ends of the stems, and means confined within the compression springs and above the upper ends of the stems cushioning downward movement of the stems in the tubes.

4. In combination a vehicle frame of the character described having a front end part, a wheel, and a structure carrying the wheel and pivotally supported by said frame part on a single pivotal axis including spaced parallel straight tubes arranged parallel with said frame part immediately forward thereof, means connecting the upper and lower end portions of the tubes together and to the said frame part, straight stems carried by the tubes to reciprocate therein and projecting downwardly from the tubes to carry the wheel, compression springs confined in the upper end portions of the tubes above the upper ends of the stems, and means cushioning downward movement of the stems in the tubes including tubular members extending downwardly in the tubes from their upper ends and terminating above the upper ends of the stems, heads in the tubular members and connected to the stems, and compression springs carried by the tubular members to support the heads.

5. In combination a vehicle frame of the character described having a front end part, a wheel, and a structure carrying the wheel and pivotally supported by said frame part on a single pivotal axis including spaced parallel straight tubes arranged parallel with said frame part immediately forward thereof, means connecting the upper and lower end portions of the tubes together and to the said frame part, straight stems carried by the tubes to reciprocate therein and projecting downwardly from the tubes to carry the wheel, compression springs confined in the upper end portions of the tubes above the upper ends of the stems, and means cushioning downward movement of the stems in the tubes including tubular members extending downwardly in the tubes from their upper ends and terminating above the upper ends of the stems, rods projecting up from the stems into the tubular members, heads on the rods in the tubular members, and compression springs supported by the lower end portions of the tubular members and engaged under the heads.

6. In a structure of the character described a straight tube, a straight stem mounted to reciprocate in the tube and terminating therein, and cushioning means in the tube confined between the upper end thereof and the inner end of the stem including, an outer compression spring acting to check inward movement of the stem in the tube and an inner compression spring within the outer spring acting to check outward movement of the stem, the inner spring being supported by a sleeve extending into the outer spring from the upper end thereof.

HUGH A. HUTCHINS.

REFERENCES CITED

The following references are of record in the file of this patent:

UNITED STATES PATENTS

| Number | Name | Date |
| --- | --- | --- |
| 438,124 | Warwick | Oct. 7, 1890 |
| 664,052 | Lawry | Dec. 18, 1900 |
| 723,075 | Thoms | Mar. 17, 1903 |
| 783,236 | Ashburn | Feb. 21, 1905 |
| 1,605,680 | Merkel | Nov. 2, 1926 |
| 2,123,388 | Viguerie | July 12, 1938 |

FOREIGN PATENTS

| Number | Country | Date |
| --- | --- | --- |
| 7,845 | Great Britain | Aug. 6, 1909 |
| 26,921 | France | Dec. 6, 1923 |
| 284,118 | Great Britain | Jan. 26, 1928 |